United States Patent
Swamy

[19]

[11] Patent Number: 6,009,004
[45] Date of Patent: Dec. 28, 1999

[54] SINGLE-PHASE HARMONIC FILTER SYSTEM

[75] Inventor: Mahesh Mysore Swamy, Gurnee, Ill.

[73] Assignee: MTE Corporation, Menomonee Falls, Wis.

[21] Appl. No.: 09/140,247

[22] Filed: Aug. 26, 1998

Related U.S. Application Data

[63] Continuation-in-part of application No. 08/947,520, Jun. 30, 1997.

[51] Int. Cl.$^6$ ..................................................... H02M 1/12
[52] U.S. Cl. .............................................. 363/47; 333/175
[58] Field of Search ................................. 363/39, 45, 47, 363/48; 323/266; 327/551; 333/175

[56] References Cited

U.S. PATENT DOCUMENTS

| | | |
|---|---|---|
| 1,860,102 | 5/1932 | Kouyoumjian . |
| 2,305,153 | 12/1942 | Fries . |
| 2,756,414 | 7/1956 | Doremus . |
| 2,976,481 | 3/1961 | Carpenter . |
| 2,977,488 | 3/1961 | Walz et al. . |
| 3,010,064 | 11/1961 | Ross . |
| 3,187,156 | 6/1965 | Seulen et al. . |
| 3,555,291 | 1/1971 | Dewey . |
| 3,818,268 | 6/1974 | Peltz . |
| 3,832,626 | 8/1974 | Stut ........................................ 363/47 X |
| 3,849,677 | 11/1974 | Stacey et al. . |
| 3,986,076 | 10/1976 | Rottier . |
| 4,222,096 | 9/1980 | Capewell ................................... 363/44 |
| 4,228,492 | 10/1980 | Hausler et al. ............................ 363/48 |
| 4,245,288 | 1/1981 | McLyman .............................. 363/47 X |
| 4,369,416 | 1/1983 | Zapp et al. .............................. 333/175 |
| 4,376,911 | 3/1983 | Kaneda .................................... 315/244 |
| 4,453,145 | 6/1984 | Schuster .............................. 333/175 X |
| 4,462,071 | 7/1984 | Blok ...................................... 363/47 X |
| 4,636,708 | 1/1987 | Whyte ...................................... 323/210 |
| 4,672,522 | 6/1987 | Lesea ....................................... 363/48 |
| 4,678,927 | 7/1987 | Stein et al. ............................. 363/48 X |
| 4,689,735 | 8/1987 | Young ...................................... 363/155 |
| 4,792,887 | 12/1988 | Bernitz et al. ............................. 363/89 |
| 4,808,843 | 2/1989 | Hedin ....................................... 307/105 |
| 4,841,220 | 6/1989 | Tabisz et al. ............................. 323/282 |
| 4,930,061 | 5/1990 | Slack et al. ................................ 363/44 |
| 5,038,263 | 8/1991 | Marrero et al. ........................ 363/47 X |
| 5,077,517 | 12/1991 | Tanoue et al. ............................ 323/207 |
| 5,093,641 | 3/1992 | Wolpert .................................. 363/47 X |
| 5,148,360 | 9/1992 | Nguyen ..................................... 363/48 |
| 5,321,348 | 6/1994 | Vinciarelli et al. ...................... 323/222 |
| 5,444,609 | 8/1995 | Swamy et al. ............................ 363/47 |
| 5,459,375 | 10/1995 | Nilssen .................................... 315/247 |
| 5,471,118 | 11/1995 | Nilssen .................................... 315/247 |
| 5,844,791 | 12/1998 | Swamy ...................................... 363/47 |

FOREIGN PATENT DOCUMENTS

| | | |
|---|---|---|
| 388954 | 3/1933 | Germany . |
| 30 12 747 | 10/1981 | Germany . |
| 58-163271 | 9/1983 | Japan . |

Primary Examiner—Y. J. Han
Attorney, Agent, or Firm—Foley & Lardner

[57] ABSTRACT

Disclosed is a new single-phase passive harmonic filter for one or more nonlinear loads. The filter improves the total system performance by drastically reducing the line side current harmonics generated by nonlinear loads. The filter includes two inductive portions across one of which is connected a tuning capacitor. The parallel combination of one inductive portion with the tuning capacitor forms a series tuned filter configuration while the second inductive portion is used for harmonic attenuation. A shunt capacitor is employed for shunting higher order harmonic components. A single-phase passive voltage regulator provides the needed voltage bucking to prevent over voltage at the load terminals of the filter. The filter provides an alternate path for the harmonic currents generated by nonlinear loads. The over voltage caused by the increased capacitive reactance is controlled by either capacitor switching or by the use of the passive voltage regulator or a combination of the two. Capacitor switching is dependent upon load conditions.

8 Claims, 7 Drawing Sheets

12.5A / DIV VERTICAL    3.3MS / DIV HORIZ.

75.0V / DIV VERTICAL    3.3MS / DIV HORIZ

SINGLE-PHASE HARMONIC FILTER SYSTEM

This application is a continuation-in-part of copending application Ser. No. 08/947,520 titled "Single-Phase Harmonic Filter System", which was filed Jun. 30, 1997 by the same inventor and assigned to the same assignee.

BACKGROUND OF THE INVENTION

1. Field of the Invention

The present invention relates to filters for alternating current circuits, and more particularly relates to passive filters to remove undesirable harmonics generated on a single-phase alternating current power line servicing non-linear loads.

2. Description of Related Art

The IEEE "Recommended Practices and Requirements for Harmonic Control and Electrical Power Systems", IEEE standard 519-1992; IEEE press April 1993, indicates that harmonic currents generated by nonlinear loads create problems in an industrial/commercial multi-user environment. Single-phase AC to DC rectifier circuits such as the rectifier circuits including diodes D1–D4 illustrated in prior art drawing, FIG. 1, which are connected to DC filter capacitors C as part of and in parallel with the load R, draw pulsating currents from the alternating current source (AC source). The shape of the current pulses is shown in FIG. 2A which indicates that pulses are 180 degrees apart. Using Fourier analysis, it can be shown that such wave forms are rich in "triplen" harmonics, i.e. wave forms having frequency components which are odd multiples of three (3rd, 9th, 15th, etc.). The current wave form is also rich in the other odd order harmonics (for example, the 5th and the 7th harmonics). The magnitude of the pulse currents and hence the magnitude of the harmonics is a function of the load R connected across the DC filter capacitor C.

Some typical problems associated with current harmonics generated by nonlinear loads are: (1) increased heating in transformers supplying the nonlinear load; (2) the requirement for increased "ampacity" (capability of conductors to carry current) of conductors; (3) radio and telephone interference, and; (4) interference with other electronic controllers. Moreover, an alternating current source charging a DC filter capacitor without intervening impedance or low impedance generates a flat-topped or distorted AC voltage wave form. Flat topping or clipping is a principal cause for voltage harmonics at the input of the load and can translate to network resonance problems farther back along the line.

In addition to the aforementioned problems created by nonlinear or distorted wave forms is that the power supplied to nonlinear loads, such as to a personal computer, fax machines, telephones, data communication equipment and the like, may be violative or could lead to a violation of the recently commissioned European standards and the IEEE 519 1992 harmonic recommendations. Single-phase harmonic filters will therefore soon be essential to circuits with single-phase, nonlinear loads.

It is accepted in the art that the harmonic content in a given wave form is best depicted by the term "Total Harmonic Distortion" (THD). THD is used to define the effective harmonics on the power system. THD is defined as the ratio of the root-mean-square of the harmonic content to the root-mean-square value of the fundamental quantity (i.e., in a AC power line, 50/60 Hz component) expressed in percent. Mathematically this is in equation 1 below.

$$THD = \frac{\sqrt{\Sigma \text{ of squares of amplitudes of all harmonics}}}{\text{square of amplitude of fundamental}} \times 100 \quad \text{set forth} \quad 1$$

Shunt tuned harmonic filters such as taught in U.S. Pat. No. 4,930,061 issued on May 29, 1990 to Slack, et al., are commonly used for trapping harmonics generated by diode rectifier circuits with DC filter capacitors as shown in FIG. 1. These single-phase harmonic filters are generally tuned to a cut-off frequency approaching the third harmonic. This type of filter, such as shown in FIG. 3 of U.S. Pat. No. 4,930,061 offers only capacitive impedance at the fundamental frequency. This capacitive impedance creates an overvoltage across the line terminals which affects other equipment connected across the same line. A further disadvantage of shunt tuned harmonic filters is that they tend to import harmonics from other nonlinear loads connected to the same network causing overloading of the filter. In the circuit of FIG. 1, in addition to the third harmonic components, a bridge rectifier also generates higher order odd harmonics (5th, 7th) that require the addition of extra tuned branches in the shunt tuned harmonic filter to filter out the higher order harmonics. Such a shunt tuned harmonic filter employing 7th harmonic, 5th harmonic and high pass sections is illustrated in U.S. Pat. No. 3,555,291 issued on Jan. 12, 1971 to Dewey.

Shunt tuned harmonic filters, moreover, are also notorious for setting up harmonic resonance within a power system if improperly designed.

In order to overcome detuning of shunt tuned harmonic filters and also to remove residual ripples which the tuned filters are unable to remove, hybrid filtering techniques have been employed. In one such scheme discussed in U.S. Pat. No. 3,849,677, issued on Nov. 19, 1974 to Stacey et al., a shunt active path is provided. While this technique may be effective, it is cumbersome and requires additional components and thus increased expense because each shunt harmonic filter has to have at least one shunt active portion.

An entirely active approach has also been employed and is illustrated in the prior art in U.S. Pat. No. 4,812,669 issued on Mar. 14, 1989. While such techniques are moderately successful, the systems still are complicated, have a higher component or part count and require passive filters to filter out higher order harmonic currents.

In U.S. Pat. No. 5,444,609 issued on Aug. 22, 1995 to the present inventor (Swamy et al.), the harmonic filter disclosed therein includes series inductance, a parallel capacitance and a transformer. The filter disclosed therein is specifically adapted for variable frequency drives and is not applicable to single-phase nonlinear loads as presented in the present application. Moreover, there exists no series blocking tuned filter, as in the present application.

Another approach to reducing harmonic content in voltage and current wave form sources has been the "boost converter techniques" which shape the wave on the input AC current. This has been well documented in "An Active Power Factor Correction Technique for Three-Phase Diode Rectifiers" by A. R. Prasad, P. D. Ziogas, and S. Manias, IEEE Transactions on Power Electronics, January 1991, Volume 6, No. 1, pages 83–92; and in "Analysis and Design of a New Three-Phase Power Conditioner Providing Sinusoidal Input Currents and Multiple Isolated DC Outputs", by Johann W. Kolar, Hans Ertl, and Franz C. Zach as documented in the Proceedings of the 26th International Conference on Power Conversion, Nurnberg, Germany, June 1993, pages 151–165. However, with boost converter techniques, the switching stress is high and there is in general about a 40% higher voltage on the DC side than is normally acceptable. Thus, boost type AC to DC converters are not as popular with rectifier type loads. However, arc discharge and fluorescent lamps require higher voltages to trigger and hence such technology is acceptable with such loads in order to mitigate the effects of harmonics.

SUMMARY OF THE INVENTION

In view of the above, it is a principal object of the present invention to provide a novel, single-phase passive harmonic filter, which provides significant reduction in current and voltage harmonics generated by single-phase nonlinear load or loads.

Another object of the present invention is to provide a single-phase passive harmonic filter which is simple in construction, has low component count and therefore is lower in cost, and is highly reliable in use.

Yet another object of the present invention is to provide a single-phase passive harmonic filter which does not cause over voltage across the load terminals, by incorporating a capacitor switching scheme and/or by using a passive voltage regulator.

Yet another object of the present invention is to provide a single-phase passive harmonic filter which avoids network resonance and prevents the importation of harmonics from other non-linear loads in the same network by inserting a properly designed series impedance.

Still another object of the present invention is to provide a novel single-phase passive harmonic filter which is not only able to block the third harmonic but also is able to shunt the higher order harmonics by providing a high impedance path to the third harmonic and a low impedance path for higher order harmonics.

Yet another object of the present invention is to improve true power factor in power circuits which employ single-phase power and are nonlinear in their loading of the line by reducing the total harmonic distortion in the line.

The harmonic filter of the present invention includes a single stage of series blocking filter tuned specifically to attenuate the third harmonic current component, a single-phase series inductance for harmonic attenuation of the 5th, 7th and other higher order harmonic current components, a capacitance for providing the nonlinear load with the necessary harmonic energy and a single-phase passive voltage regulator. The series inductor facilitates the flow of the required harmonic energy from the filter capacitor rather than from the AC source. The over voltage caused by the increased capacitive reactance at the output of the filter is controlled by either capacitor switching or a passive voltage regulator or a combination of the two. If the nonlinear load is expected to vary greatly, a capacitor switching technique at the output of the filter and across the load is desirable. A passive voltage regulator for regulating the load voltage may be achieved in a number of ways, for example by an isolation transformer, or by an auto transformer or even by a capacitive divider network. Active voltage regulation can also be adopted but is not preferred because it requires an increase in the component count and thus the cost of the design.

Copending application Ser. No. 08/947,520 teaches two inductances which are integrated into one AC magnetic core inductor with a suitable tap with a capacitor across the start and the tap of the integrated conductor. This combination forms the desired series tuned blocking filter while the remainder of the inductance from the tap position to the end of the winding forms the needed or required series attenuating inductor. A shunt capacitor introduced between the output of the integrated inductor (or, if two discrete inductors are used, between the output of the two-inductor combination circuit) and the supply neutral forms the main filter capacity.

Other objects and a more complete understanding of the invention may be had by referring to the following specification and claims taken in conjunction with the accompanying drawings in which:

DETAILED DESCRIPTION OF THE INVENTION

Figure 1:
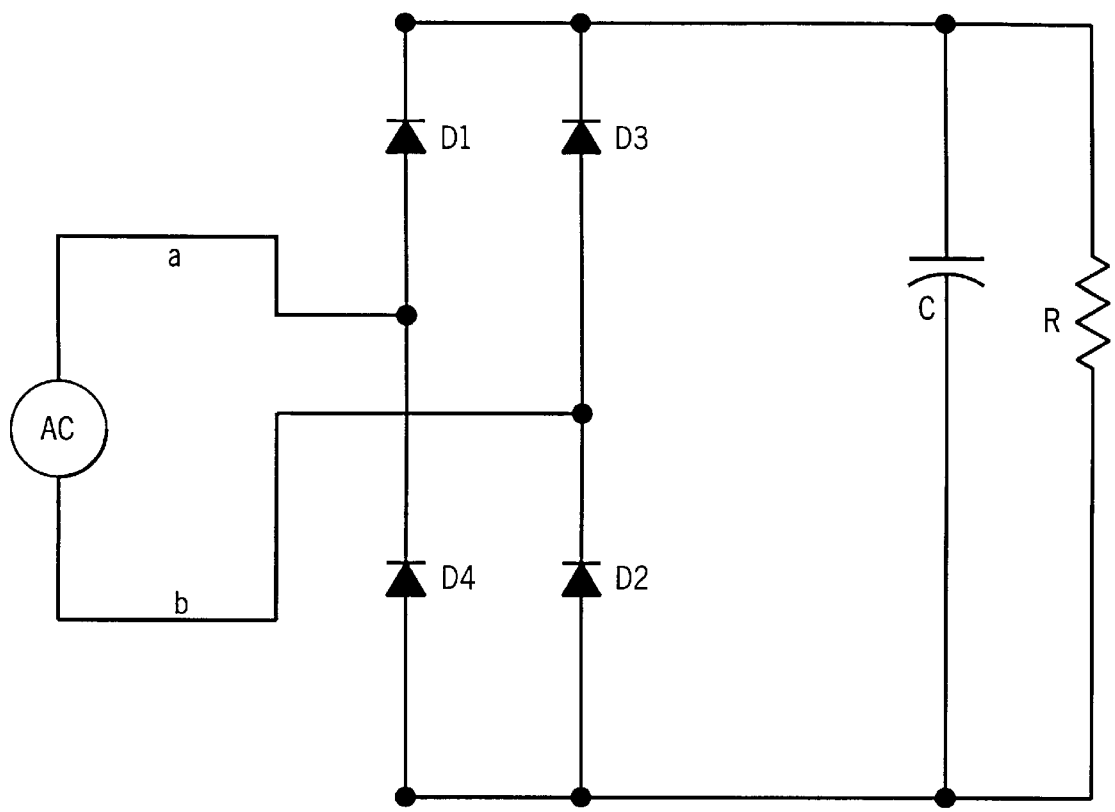
FIG. 1 is a simplified schematic diagram of a full wave rectifier and accompanying filter capacitance and a load represented by the resistance R.
Figure 2A:
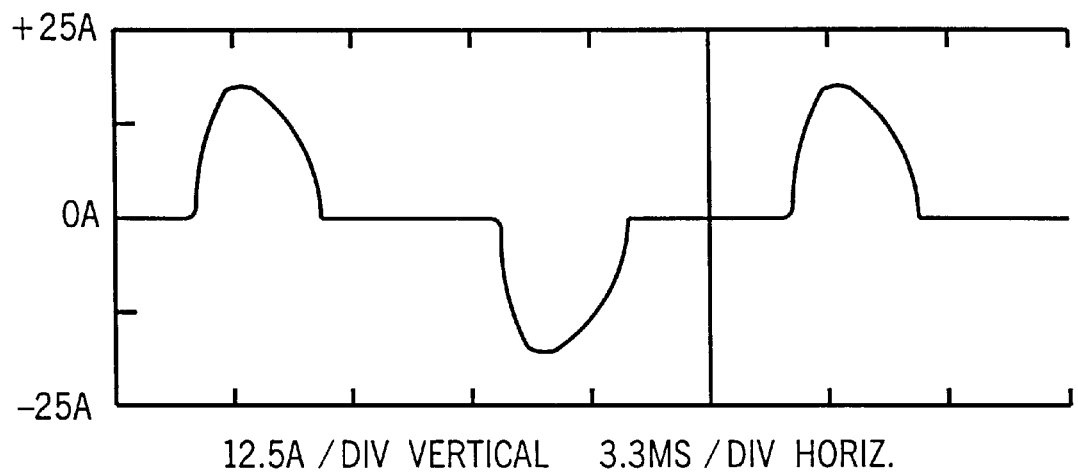
FIG. 2A is an actual single-phase snapshot of a current wave form exhibiting a 9 amp RMS wave with a 2.1 crest factor and a 1.6 form factor, as applied to a typical load as through the full-wave rectifier illustrated in FIG. 1.
Figure 2B:
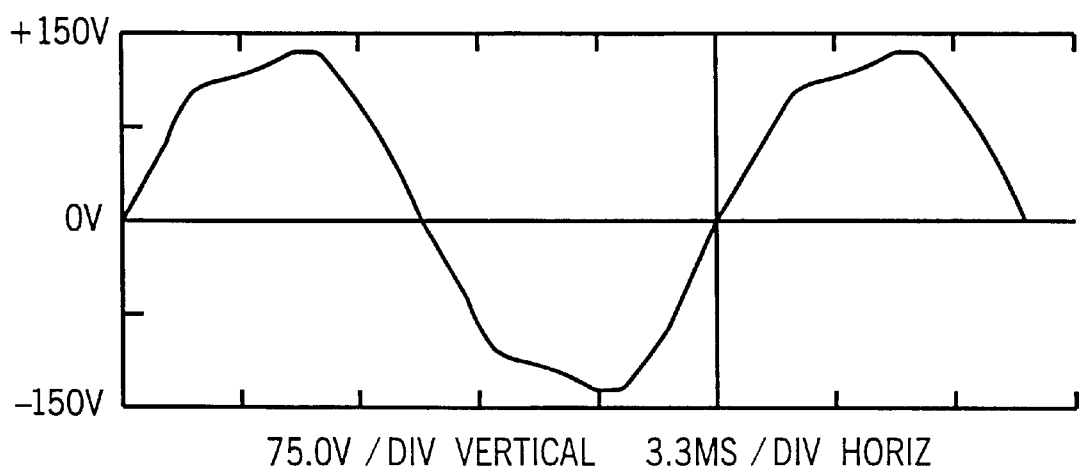
FIG. 2B is a snapshot of a single-phase voltage wave form with a RMS value of 103.6 volts, a 1.3 crest factor and a 1.1 form factor.

Turning now to the drawings, and specifically FIGS. 1 and 2, FIG. 1 illustrates a typical AC to DC rectifier with an AC source and including a filter capacitor "C" and resistor "R" across the filter capacitor representing the circuit load. The operating wave forms associated with the circuit in FIG. 1 are illustrated in FIGS. 2A and 2B (current and voltage respectively). These wave forms are taken at the input of the AC to DC convertor (Diodes D1–D4) with the DC Filter Capacitor. Inasmuch as the DC capacitor "C" in FIG. 1 draws current from the AC source only when it is discharged through the load resistance "R", the diodes and the rectifier conduct only when the instantaneous input AC voltage value is higher than the DC capacitor voltage. The result is a pulsating current being drawn from the input AC source at approximately the same time as the input AC voltage reaches its peak (FIG. 2B).

Figure 3:
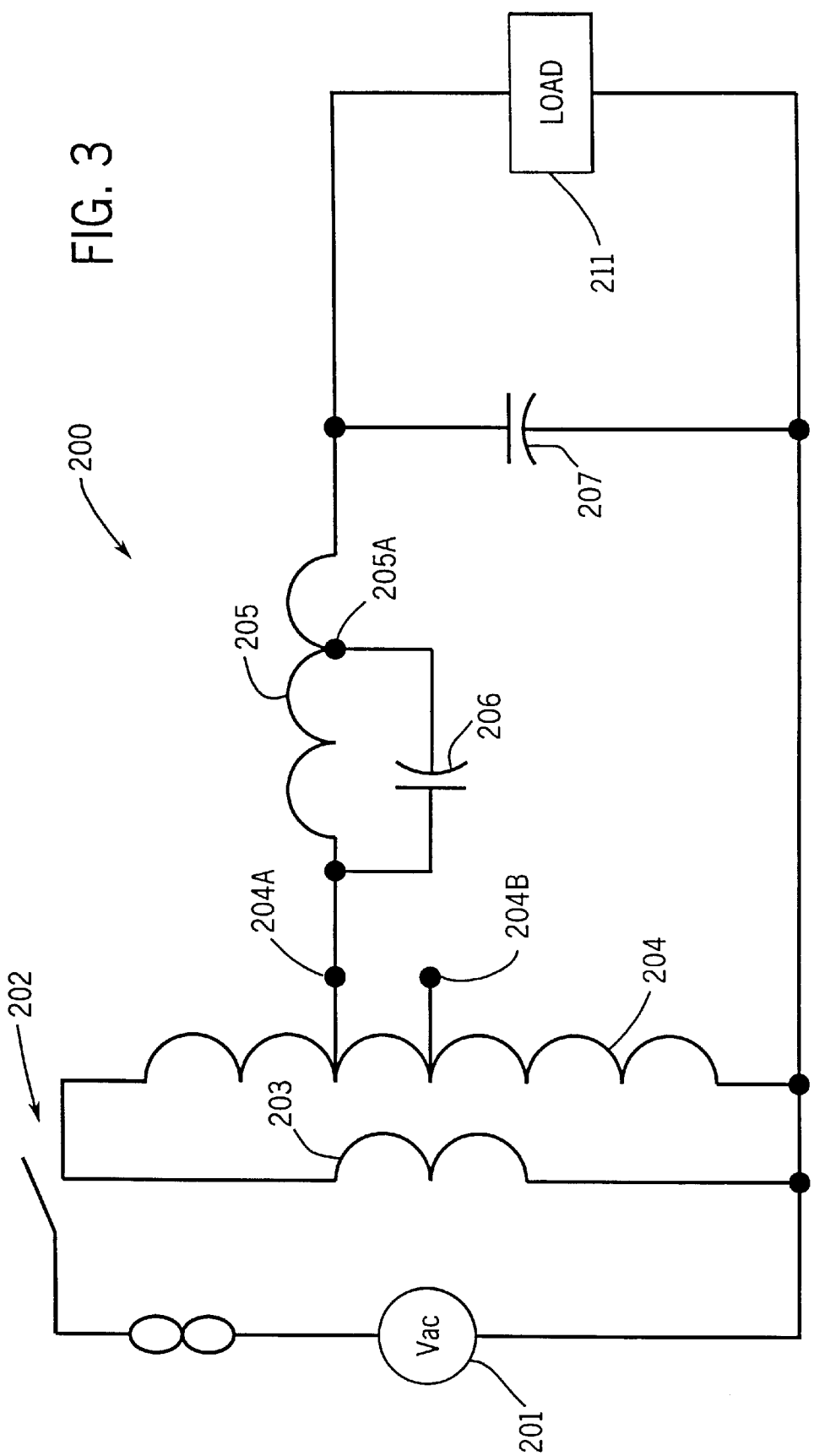
FIG. 3 is a preferred embodiment of a proposed single-phase harmonic filter particularly designed for use with a nonlinear load.

In accordance with the invention, a single-phase harmonic filter 200 for connection to at least one nonlinear load 211 is illustrated in FIG. 3. The single-phase harmonic filter 200 comprises a passive voltage regulator 204, in the present instance an auto transformer with taps at approximately 25% and 30% and identified as 204A and 204B respectively. The taps may be other than those identified and are particularly chosen to allow for some adjustment when the filter is conducting power to the load 211 to maintain the voltage across the load at a desired level. A lamp 203 is connected across the transformer to indicate the opening or closure of switch 202 which connects a source of power 201 to the coil of the auto transformer 204. Connected to one of the taps on the auto transformer 204, in the illustrated instance tap 204A, is a tapped, integrated inductor 205, the tap being identified as at 205A and having a capacitor 206 connected between the tap and the input to the inductor as between 204A and 205A in parallel with a portion of the inductor and in series with the load to form a series tuned blocking filter. The remainder of the Inductor 205, that is the part of the inductor from tap 205 to the end thereof acts as a series attenuating inductor, while the capacitor and inductor portion form a series tuned blocking filter. In the embodiment of FIG. 3, a shunt capacitor 207 is introduced between the output of the integrated inductor and the supply neutral tap at the one end of the auto transformer 204. The advantage of the series tuned filter configuration with the series blocking inductor is that they are integrated into one AC magnetic core inductor with a suitable tap, reducing the component count as well as permitting of ease of manufacture and construction. Thus the series integrated inductor L is an AC magnetic core inductor with a suitable air gap to prevent saturation. The conductor size used is selected such that it is capable of carrying, of course, the RMS current required by the load. Moreover, capacitors 206 and 207, respectively forming the series tuned blocking filter and the other forming the main shunt filter, both must have high ripple current handling capability.

Figure 4:
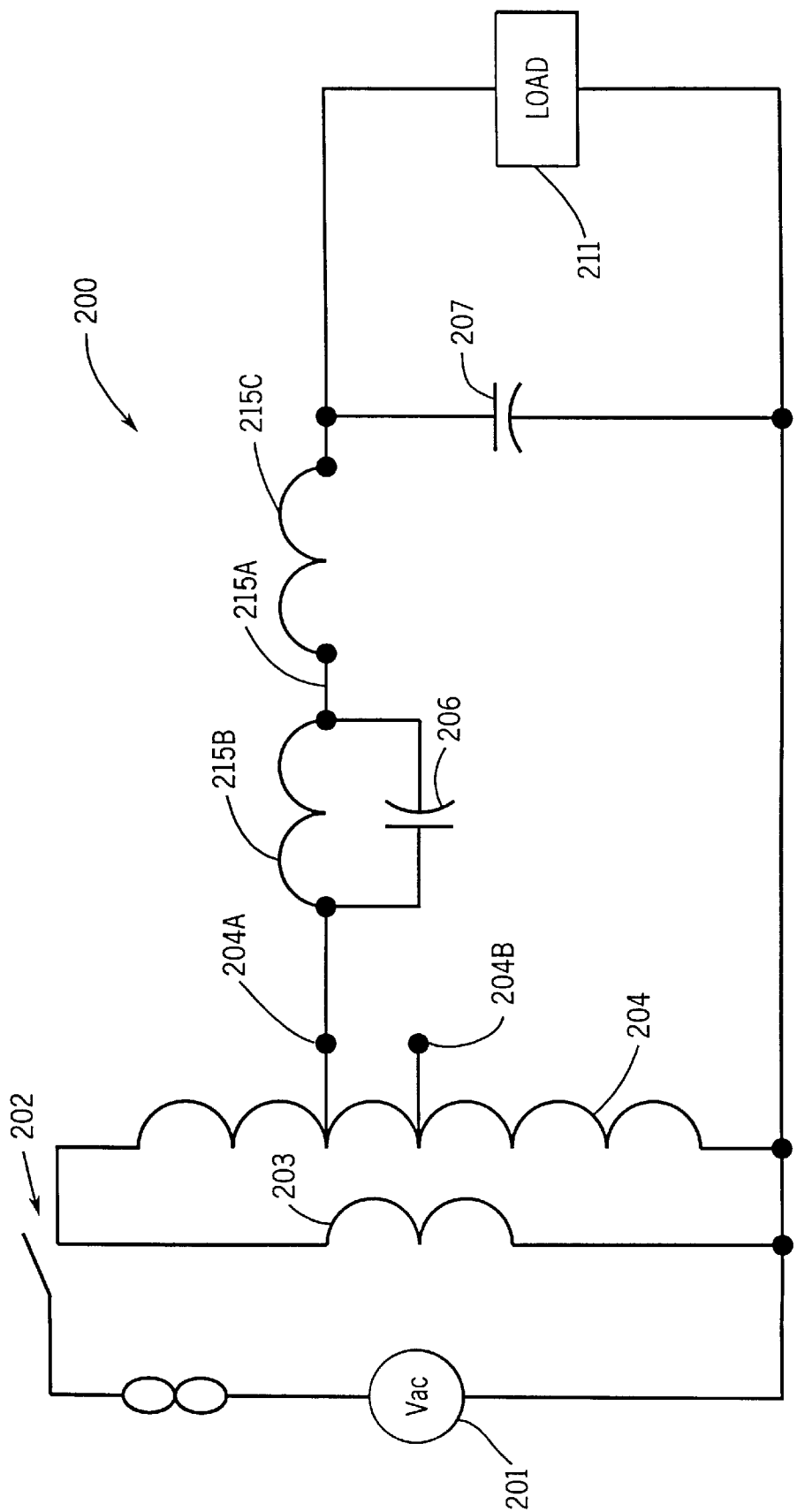
FIG. 4 is an alternate embodiment of the proposed single-phase harmonic filter of FIG. 3 in which the filter includes two discrete inductors in place of the single integrated inductor.

The embodiment of single-phase harmonic filter 200 shown in FIG. 3 is a preferred embodiment since the inductive portions of both the series blocking filter and the series inductance are combined into integrated inductor 205. Referring to FIG. 4, an alternate embodiment of single-phase harmonic filter 200 is shown. This alternate embodiment includes two discrete inductors, 215B and 215C, in place of integrated inductor 205. Further, capacitor 206 is connected in parallel with a first of the discrete inductors (inductor 215B), rather than in parallel with a portion of an inductor, and is connected to a node 215A located between the discrete inductors, rather than to a tap of an inductor. In this configuration, the parallel combination of inductor 215B and capacitor 206 forms the desired series tuned blocking filter. Inductor 215C along with shunt capacitor 207 (introduced between the output and supply neutral) form the main low pass L-type filter section. Also, each of inductors 215B and 215C is designed on an iron core with a suitable air-gap to prevent saturation. The conductor size used is selected such that it is capable of carrying, of course, the true RMS current required by the load.

Figure 5:
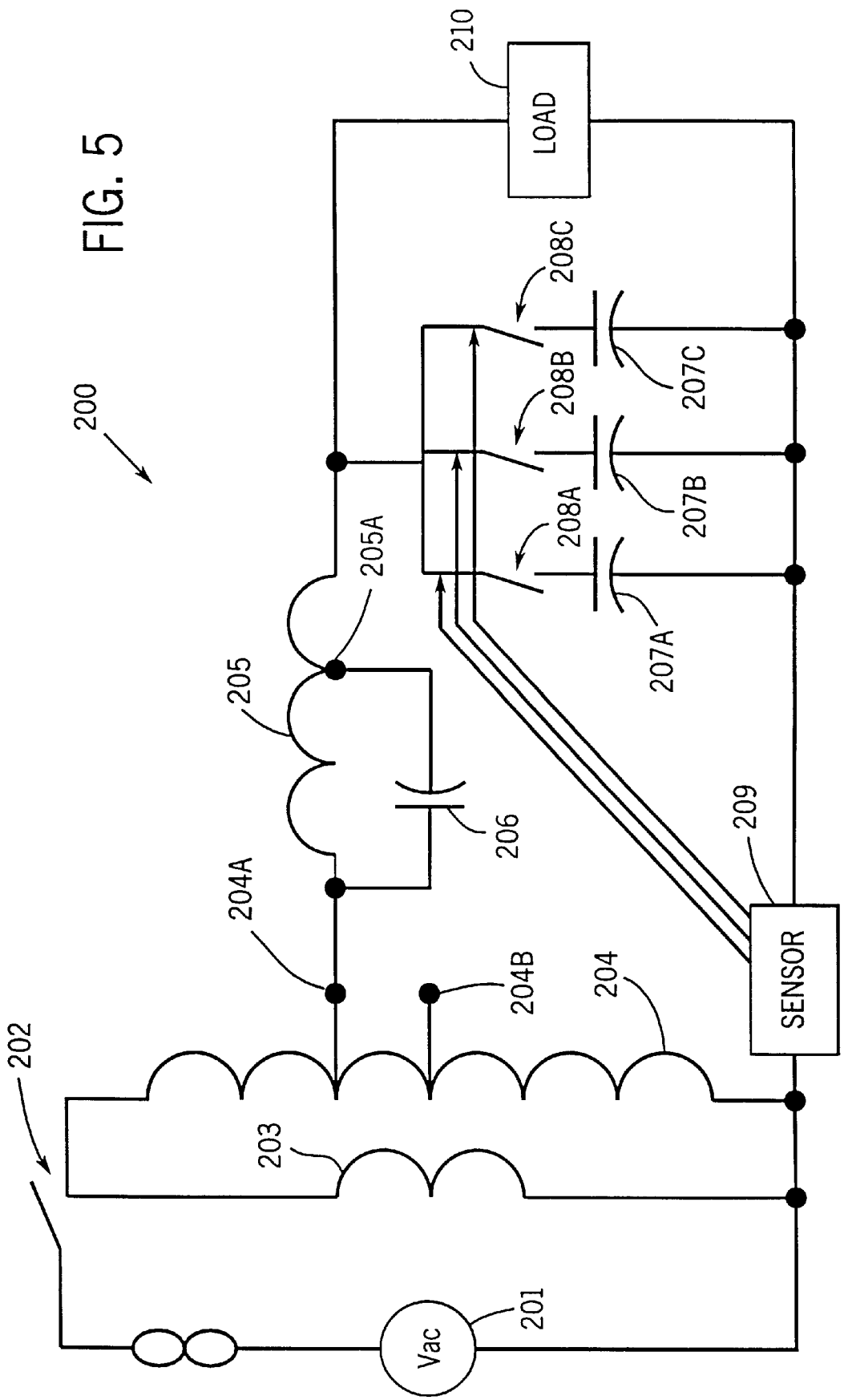
FIG. 5 is a preferred embodiment of a proposed single-phase harmonic filter for use with nonlinear loads if the load is changing significantly.
Figure 6:
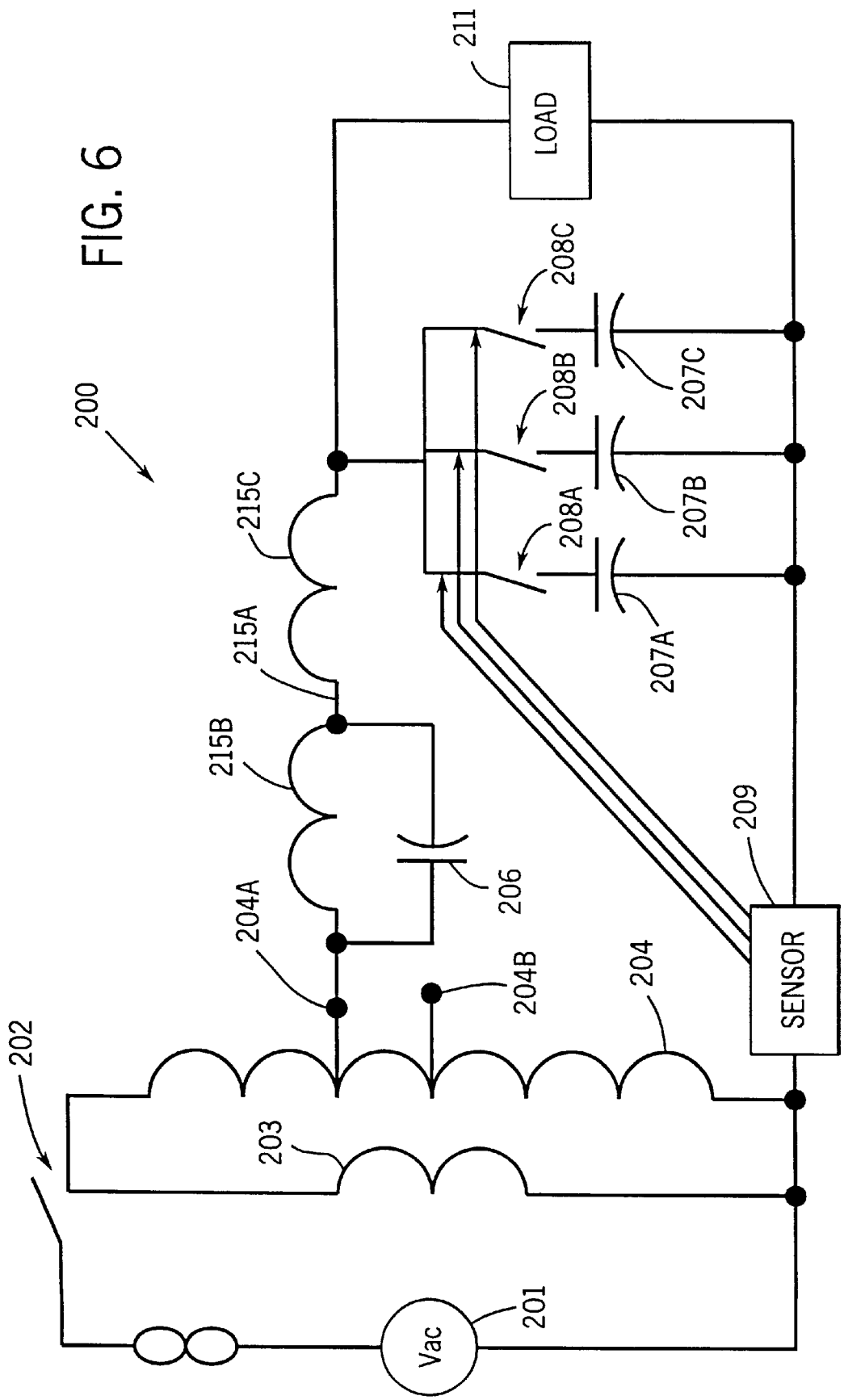
FIG. 6 is an alternate embodiment of the proposed single-chase harmonic filter of FIG. 5 (for use with nonlinear loads if the load is changing significantly) in which the filter includes two discrete inductors in place of the single integrated inductor.

Referring to FIGS. 5 and 6, two alternate embodiments of single-phase harmonic filter 200, for use with nonlinear loads if the load is changing significantly, are shown. The two embodiments are identical except that the embodiment of FIG. 5 includes integrated inductor 205 with tap 205A (as in FIG. 3) while the embodiment of FIG. 6 includes discrete inductors 215B and 215C connected by node 215A (as in FIG. 4). (For the same reasons that the embodiment of FIG. 3 is preferred to that of FIG. 4, the embodiment of FIG. 5 is preferred to that of FIG. 6.) In the embodiments of FIGS. 5 and 6, capacitor 207 acts as a power factor correcting capacitor at the fundamental frequency, resulting in an over voltage at the nonlinear load terminals. The over voltage may be taken care of by one of two methods. Preferably, the passive voltage regulator or auto transformer 204 reduces the input voltage to the filter section thus compensating for the over voltage due to the power factor correcting capacitor 207. By providing the auto transformer tapped in a manner which reduces the input voltage by approximately 25%, the observed 25% boost in the voltage due to the presence of integrated inductor 205 (in FIG. 5) or discrete inductors 215B and 215C (in FIG. 6) and shunt capacitor 207 in the filter circuit is compensated.

The second method of compensating for the over voltage is by providing, such as illustrated in FIGS. 5 and 6, a series of capacitors 207A, 207B and 207C which are connected through individually activated switches, 208A–208C, respectively to the output side of integrated inductor 205 (in FIG. 5) or discrete inductor 215C (in FIG. 6). Thus, the capacitors and switches are connected across the load and may compensate for over voltage by switching the capacitors in and out, as desired. Moreover, it is possible to adjust the voltage across the load as by a current sensor 209 and suitable relays for opening and closing the switches 208A–208C as the case may be. However, this adds again to part count and complexity and is unnecessary if the auto transformer or isolation transformer with suitable voltage taps is provided. In practice, a combination of the two methods may give an even finer adjustment, filtering and blockage of the undesirable harmonics on the line.

The following advantages of these configurations are easily seen. The first part of the series integrated inductance 205 (as in FIG. 5) or the first discrete inductor 215B (as in FIG. 6), in conjunction with the series tuning capacitor 206, offers high attenuation to the most offending third harmonic current component. The remaining part of the integrated inductance 205 (as in FIG. 5) or second discrete inductor 215C (as in FIG. 6) offers high impedance to the flow of harmonic currents and also helps prevent overloading of filter capacitor 207. Of course, another advantage to the structures as shown in FIGS. 3 through 6 is that the integrated inductor or discrete inductors (as the case may be) prevent over voltage across the shunt capacitor from appearing across the input supply. Moreover, shunt capacitor 207 offers a low impedance path to harmonic currents which occur due to nonlinear loads. This prevents harmonic current flow from the input supply to the load 210. In addition, the presence of properly designed series integrated inductor 205 or discrete inductors 215 (as the case may be) reduces the possibility of network resonance.

The embodiments of the single-phase harmonic filter may be implemented by employing the following methods.

A. For the embodiments that include integrated inductor 205 (e.g., as shown in FIGS. 3 and 5):

1. Compute the per unit impedance ($Z_{pu}$) of the nonlinear load, for which filtering has to be provided. This can be achieved as shown below:

$$Z_{pu} = \frac{V_{pu}}{I_{pu}} \qquad 2$$

where, $V_{pu}$=Nominal line to neutral system voltage and $I_{pu}$=RMS value of rated load current 2. The value of the integrated filter inductance 205 in Henries is:

$$L = \frac{0.24 * Z_{pu}}{\omega} = \frac{0.24 * Z_{pu}}{2 * \pi * f} \quad 3$$

f is frequency of the ac input supply (60 Hz in N. America; 50 Hz in Europe and Asia).

3. The position of the tap (205A) in Henries is set at:

$$L_{tap} = \frac{0.15 * Z_{pu}}{\omega} = \frac{0.15 * Z_{pu}}{2 * \pi * f} \quad 4$$

4. The value of the series tuning filter capacitor 206 in Farads is:

$$C_s = \frac{1}{4 * \pi^2 * (3 * f)^2 * L_{tap}} \quad 5$$

5. The shunt capacitance 207 in Farads is selected to be:

$$C = \frac{1}{4 * \pi^2 * (2.5 * f)^2 * L} \quad 6$$

The capacitors 206 and 207 should have adequate ripple current handling capability.

As an example, suppose the single-phase harmonic filter was to be employed with a nonlinear load such as a personal computer.

(a) Let the system voltage be 120V at 60 Hz. Let the fundamental load current be 3.0 A. From these assumptions, the value of $Z_{pu}$ is computed to be 120/3=40 Ω.

(b) From (3), the value of the integrated inductor, L, is computed to be: 0.02546 H or 25.46 mH.

(c) From (4), the position of the tap on the inductor, $L_{tap}$, is hence set at 0.01591 H or 15.91 mH. This works out to be 62.5% of the total integrated inductor value L (which is in parallel with capacitor 206).

(d) From (5), the value of the series tuning filter capacitor, $C_s$, is computed to be: 49.14 μF.

(e) From (6), the value of the main shunt filter capacitor, $C_f$, is computed to be: 44.22 μF. If multiple capacitors are to be employed to incorporate the capacitor switching scheme (see FIGS. 5 and 6) then capacitors 207A–207C may be 14.74 μF each to achieve the desired capacitance value.

B. For the embodiments that include discrete inductors 215B and 215C (e.g., as shown in FIGS. 4 and 6):

1. Compute the per unit impedance ($Z_{pu}$) of the nonlinear load, for which filtering has to be provided. This can be achieved as shown below:

$$Z_{pu} = \frac{V_{pu}}{I_{pu}} \quad 7$$

where, $V_{pu}$=Nominal line to neutral system voltage and $I_{pu}$=RMS value of rated load current 2. The value of the tuning filter inductance 215B in Henries is:

$$L_3 = \frac{0.15 * Z_{pu}}{\omega} = \frac{0.15 * Z_{pu}}{2 * \pi * f} \quad 8$$

f is frequency of the ac input supply (60 Hz in N. America; 50 Hz in Europe and Asia).

3. The value of the low pass filter inductance 215C in Henries is:

$$L_f = \frac{0.09 * Z_{pu}}{\omega} = \frac{0.09 * Z_{pu}}{2 * \pi * f} \quad 9$$

4. The value of the series tuning filter capacitor 206 in Farads is:

$$C_s = \frac{1}{4 * \pi^2 * (3 * f)^2 * L_3} \quad 10$$

5. The shunt capacitance 207 in Farads is selected to be:

$$C_f = \frac{1}{4 * \pi^2 * (2.5 * f)^2 * (L_3 + L_f)} \quad 11$$

The capacitors 206 and 207 should have adequate ripple current handling capability.

As an example, suppose the single-phase harmonic filter was to be employed with a nonlinear load such as a personal computer.

(a) Let the system voltage be 120V at 60 Hz. Let the fundamental load current be 3.0 A. From these assumptions, the value of $Z_{pu}$ is computed to be 120/3=40 Ω.

(b) From (8), the value of the inductor, $L_3$, is computed to be: 0.01591 H or 15.91 mH.

(c) From (9), the low pass filter inductor, $L_f$, is calculated to be: 0.00955 H or 9.55 mH.

(d) From (10), the value of the series tuning filter capacitor, $C_s$, is computed to be: 49.14 μF.

(e) From (11), the value of the main shunt filter capacitor, $C_f$, is computed to be: 44.22 μF. If multiple capacitors are to be employed to incorporate the capacitor switching scheme (see FIGS. 5 and 6) then capacitors 207A–207C may be 14.74 μF each to achieve the desired capacitance value.

Figure 7:
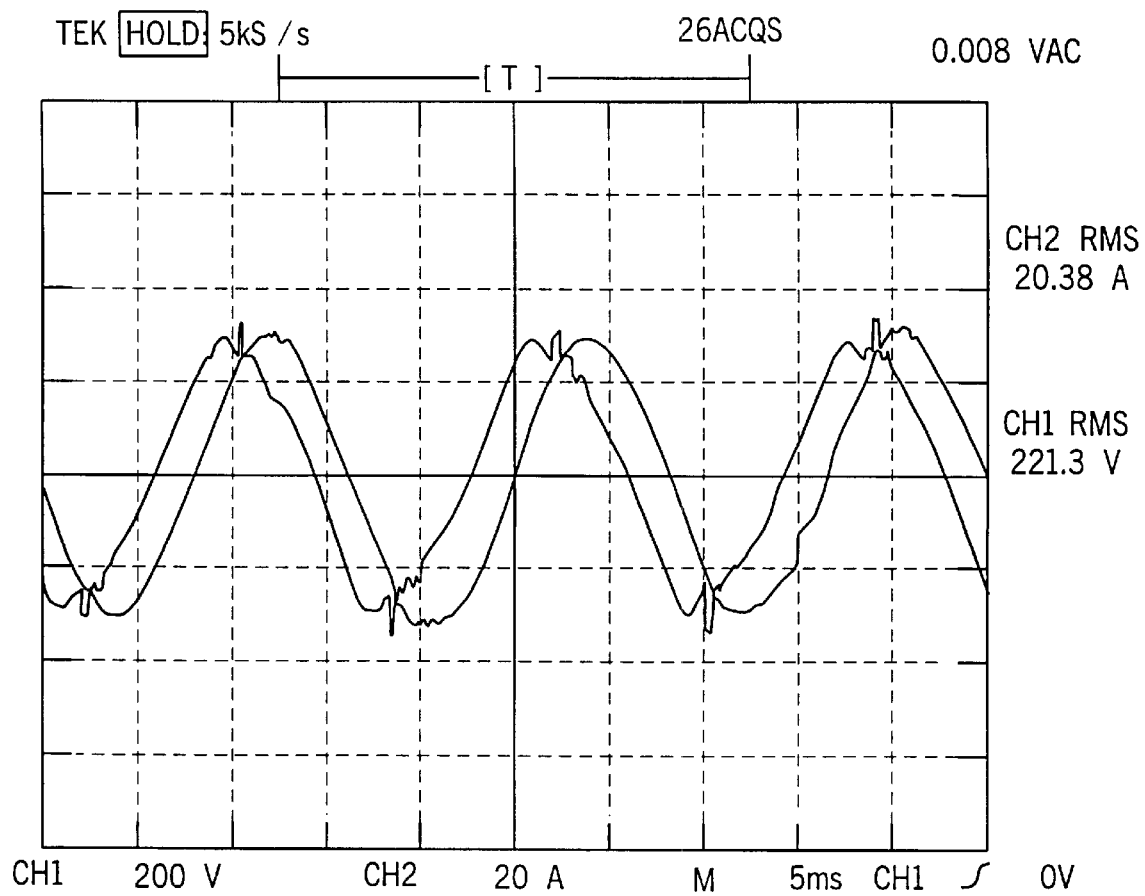
FIG. 7 is a typical voltage and current wave form at the input of the novel single-phase harmonic filter operating on a rectifier load such as illustrated in FIG. 1 and showing the improved conditions and wave forms of both current and voltage.

FIG. 7 illustrates the voltage and current wave forms at the input of the single-phase harmonic filter operating on a load such as shown in FIG. 1 (a rectifier load) and illustrates how the current and voltage wave forms are vastly improved over that shown in the actual pictures depicted in FIG. 2. Notice that the current once again leads the voltage wave form and that the single-phase harmonic filter of the present invention has been designed for approximately 20 amps and at a voltage of 220 volts.

Thus, in determining the exact single-phase harmonic filter for the nonlinear load, one would first determine the voltage and current requirements of the load. From this information, one would then (knowing the frequency of the supply that was to be employed) either (a) calculate the value of the integrated filter inductance and set the tap position of the inductor or (b) calculate the values of the tuning filter inductance and the low pass filter inductance (depending, respectively, upon whether the particular embodiment included integrated inductor 205 or discrete inductors 215B and 215C). Next, one would determine the value of the series tuning filter capacitor. Thereafter, the shunt capacitor 207 would be calculated so that the series inductor(s) facilitated flow of harmonic energy from the filter capacitor 207 rather than from the source by offering adequate impedance for flow of harmonic energy from the source. The calculations given in equations 6 and 11 allow for resonance with the filter inductor at a frequency between the second and third harmonics.

Thus the single-phase harmonic filter of the present invention is especially useful with nonlinear loads, is simple in construction with low component count, high reliability and low cost. Moreover, by the construction of the novel harmonic filter, there is no over voltage across the line terminals, and the filter itself does not import harmonics from other harmonic-generating loads which may be in the same network. Moreover, because of the design, network resonance is held to a minimum and because of the location, in one type of embodiment, and the capability of switching capacitors across the load one after another to compensate for variations in the load, in another type of embodiment, there are no higher switching stresses even when switching is involved. Moreover, the implementation of the single-phase harmonic filter of the present invention by employing a passive voltage regulator and its inherent ability to block both third harmonics and shunt the higher order harmonics by providing a high impedance path for the third and a low impedance path for higher order harmonics, are real advantages of the filter of the present invention. An added advantage is the true power factor of the filter is improved because of the reduction in total harmonic distortion.

While the invention has been described with a certain degree of particularity, numerous changes in the construction and method of operation of the invention may be made without departing from the spirit and scope of the invention as set forth in the claims appended hereto.

What is claimed is:

1. A single-phase harmonic filter for connection to a nonlinear load, said harmonic filter comprising:

a passive voltage regulator for connection to a source of AC power;

inductive circuitry having a first inductive portion and a second inductive portion with an electrical connection point between said portions, a capacitor connected in parallel with said first inductive portion and in series with said load and said passive voltage regulator to form a series tuned blocking filter; the second inductive portion forming a series attenuating inductive portion;

and a shunt capacitor for connection between the output of said inductive circuitry and across the nonlinear load.

2. A single-phase harmonic filter in accordance with claim 1 wherein said first inductive portion is a first inductor, said second inductive portion is a second inductor, and said electrical connection point is a node.

3. A single-phase harmonic filter in accordance with claim 2 wherein each of said first and second inductors is an AC magnetic core inductor.

4. A single-phase harmonic filter in accordance with claim 3 wherein said shunt capacitor comprises a plurality of capacitors arranged in parallel, and means to switch one or more of said shunt capacitors across said load when said load increases.

5. A single-phase harmonic filter for connection to a nonlinear load, said harmonic filter comprising:

a passive voltage regulator for connection to a source of AC power;

inductive circuitry having a first inductive portion and a second inductive portion with an electrical connection point between said portions, a fixed-capacitance capacitor connected in parallel with said first inductive portion and in series with said load and said passive voltage regulator to form a series tuned blocking filter, wherein said fixed-capacitance capacitor is the sole element connected in parallel with said first inductive portion; the second inductive portion forming a series attenuating inductive portion; wherein said passive voltage regulator passes AC power to said inductive circuitry and said fixed-capacitance capacitor, which in turn pass AC power to the nonlinear load;

and a shunt capacitor for connection between the output of said inductive circuitry and across the nonlinear load.

6. A single-phase harmonic filter in accordance with claim 5 wherein said first inductive portion is a first inductor, said second inductive portion is a second inductor, and said electrical connection point is a node.

7. A single-phase harmonic filter in accordance with claim 6 wherein each of said first and second inductors is an AC magnetic core inductor.

8. A single-phase harmonic filter in accordance with claim 7 wherein said shunt capacitor comprises a plurality of capacitors arranged in parallel, and means to switch one or more of said shunt capacitors across said load when said load increases.

* * * * *